US012717977B2

(12) United States Patent
Nambannor Kunnath et al.

(10) Patent No.: US 12,717,977 B2
(45) Date of Patent: Aug. 25, 2026

(54) PROXIMITY-BASED CONTENT VISIBILITY CONTROL

(71) Applicant: Omnissa, LLC, Mountain View, CA (US)

(72) Inventors: Ramanandan Nambannor Kunnath, Bangalore (IN); Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 447 days.

(21) Appl. No.: 18/124,028

(22) Filed: Mar. 21, 2023

(65) Prior Publication Data

US 2024/0232443 A1 Jul. 11, 2024

(30) Foreign Application Priority Data

Jan. 11, 2023 (IN) ............................ 202341002217

(51) Int. Cl.

*G06F 21/84* (2013.01)
*G06F 21/35* (2013.01)
*G06F 21/62* (2013.01)

(52) U.S. Cl.

CPC ............. *G06F 21/84* (2013.01); *G06F 21/35* (2013.01); *G06F 21/6209* (2013.01); *G06F 21/6218* (2013.01); *G06F 2221/2111* (2013.01)

(58) Field of Classification Search

CPC ...... G06F 21/35; G06F 21/34; G06F 21/6209; G06F 21/6218; G06F 21/84; G06F 2221/2111

See application file for complete search history.

(56) References Cited

U.S. PATENT DOCUMENTS 10,303,892 B1 * 5/2019 Lim ...................... G06F 16/986
2003/0208686 A1 * 11/2003 Thummalapally .......................... G06F 21/6218 713/193
2007/0113081 A1 * 5/2007 Camp .................... G06F 21/10 713/168
2013/0275973 A1 * 10/2013 Greenfield ............. G06F 21/10 718/1
2014/0187152 A1 * 7/2014 Johnson .................. H04B 5/20 455/41.1

(Continued)

*Primary Examiner* — Theodore C Parsons
(74) *Attorney, Agent, or Firm* — Kim & Stewart LLP

(57) ABSTRACT

The present disclosure relates to proximity-based content visibility control. A secondary client device can request access to an enterprise resource and receive metadata associated with the enterprise resource. The secondary client device can provide, to a primary client device via a peer-to-peer communication channel, data associated with a proximity of the secondary client device to the primary client device. When the proximity falls below a predefined proximity threshold, the secondary client device can receive an access token from the primary client device via the peer-to-peer communication channel. The secondary client device can render the enterprise resource in a display. The secondary client device can receive a notification from the primary client device that the proximity meets or exceeds the predefined proximity threshold. The secondary client device can obscure at least one sensitive portion of the enterprise resource in the display based at least in part on the metadata.

12 Claims, 4 Drawing Sheets

(56) References Cited

U.S. PATENT DOCUMENTS

| | | | | |
|---|---|---|---|---|
| 2014/0189363 | A1* | 7/2014 | Thomas | G06F 12/1466<br>713/189 |
| 2014/0208095 | A1* | 7/2014 | Stuntebeck | H04L 63/168<br>713/152 |
| 2015/0296074 | A1* | 10/2015 | Shah | H04W 12/08<br>455/418 |
| 2016/0285835 | A1* | 9/2016 | Linga | G06F 21/6218 |
| 2016/0337863 | A1* | 11/2016 | Robinson | H04W 4/021 |
| 2020/0342144 | A1* | 10/2020 | Alameh | G06F 3/0482 |

* cited by examiner

PROXIMITY-BASED CONTENT VISIBILITY CONTROL

RELATED APPLICATIONS

Benefit is claimed under 35 U.S.C. 119(a)-(d) to Foreign Application Serial No. 202341002217 filed in India entitled "PROXIMITY-BASED CONTENT VISIBILITY CONTROL", on Jan. 11, 2023, by VMware, Inc., which is herein incorporated in its entirety by reference for all purposes.

BACKGROUND

Corporate employees may have access to confidential enterprise content that should only be seen or shown to the people associated to the enterprise. Employees may access this content on multiple of their own devices, or even in shared or public spaces. In these situations, devices displaying sensitive enterprise content are often left unattended.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

The present disclosure related to proximity-based content visibility control. With the advent of the bring-your-own-device (BYOD) paradigm and heavy utilization of co-working spaces, enterprise data may be accessible to the employees that are in public or otherwise insecure spaces. In those situations, confidential enterprise data could be viewed, overheard, or otherwise accessed by parties who are unaffiliated with the enterprise. For example, an unaffiliated party can gain access to or view enterprise data from a user's device when the user leaves the device unattended and the device is left unlocked or otherwise unsecured.

These issues can be addressed by proximity-based content visibility control. When a user attempts to view sensitive portions of an enterprise resource on a secondary client device, whether the sensitive content is fully visible or obscured can be determined on whether a designated primary client device is nearby. If a proximity of the secondary client device to the primary client device meets or exceeds a predefined threshold, the secondary client device can obscure the sensitive content. On the other hand, if this proximity is below the predefined threshold, the sensitive content can be fully visible.

Figure 1:
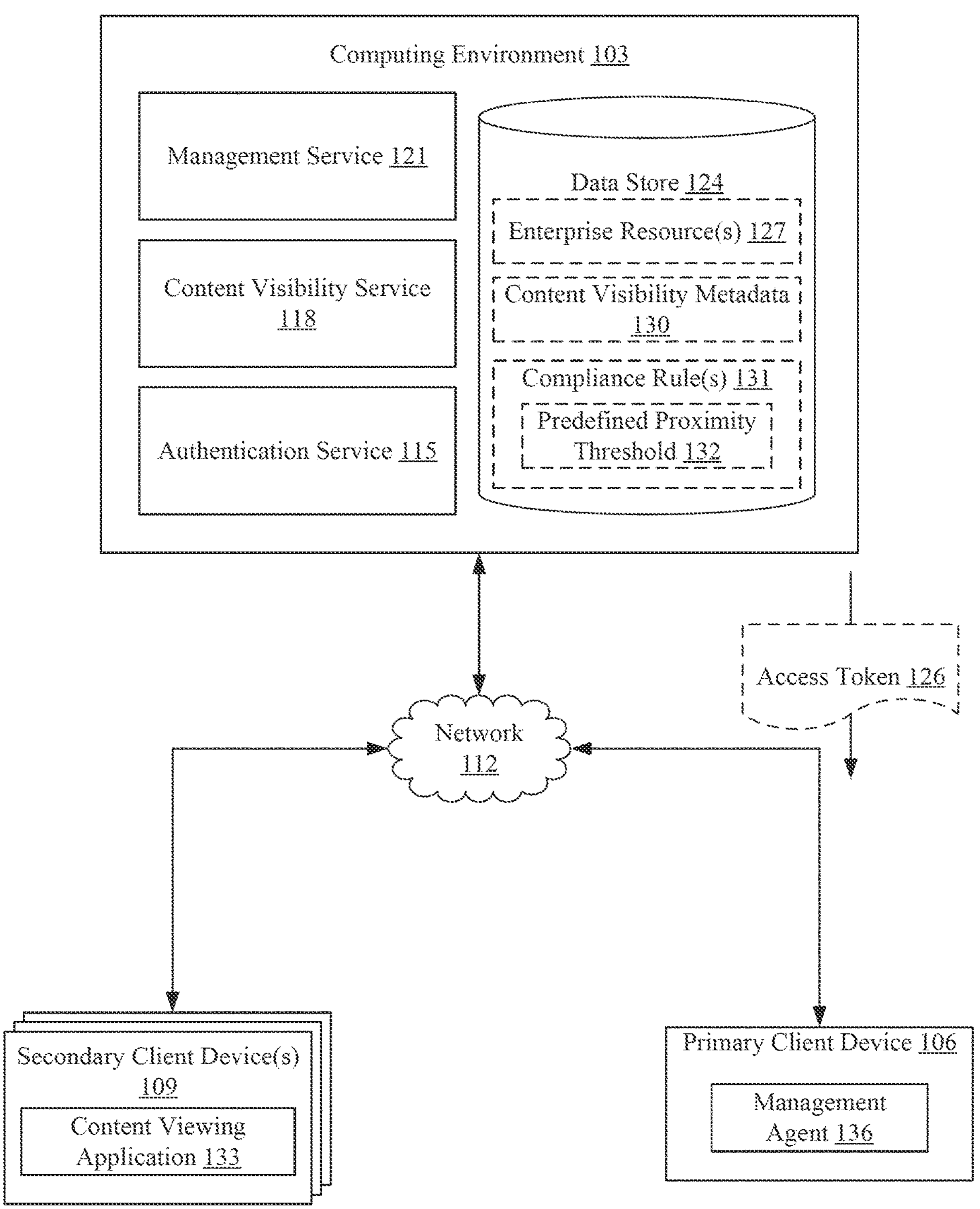
FIG. 1 shows an example of a networked environment, according to various embodiments of the present disclosure.

FIG. 1 shows an example of a networked environment 100 according to various embodiments. The networked environment 100 can include a computing environment 103, primary client device 106, and one or more secondary client device(s) 109, in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the primary client device 106 and secondary client device(s) 109. In that context, the computing environment 103 can execute an authentication service 115, a content visibility service 118, a management service 121, and potentially other applications. The computing environment 103 can also include a data store 129.

The data store 129 can include memory of the computing environment 103, mass storage resources of the computing environment 103, or any other storage resources on which data can be stored by the computing environment 103. The data store 129 can include one or more databases, such as a structured query language (SQL) database, a non-SQL database, or other appropriate database. The data stored in the data store 129, for example, can be associated with the operation of the various applications or functional entities described below. The data store 129 can include one or more enterprise resources 127, content visibility metadata 130, one or more compliance rules 131, and potentially other data.

The enterprise resource service 114 can be executed to handle requests to access enterprise resources 127. For example, the enterprise resource service 114 can receive a request to access a particular enterprise resource 127 from the secondary client device 109. If authentication is required to access the enterprise resource 127, the enterprise resource service 114 can redirect the access request to the authentication service 115. In some implementations, the enterprise resource service 114 can be notified by the authentication service 115 when a user of the secondary client device 109 has been successfully authenticated. After successful authentication, the enterprise resource service 114 can provide the enterprise resource 127 to the secondary client device 109, either in response to a request from the secondary client device 109 or automatically upon being notified of the successful authentication.

The authentication service 115 can be executed to handle requests to access an enterprise resource 127 from a secondary client device 109. For example, a secondary client device's 109 request to access an enterprise resource 127 can be redirected by the enterprise resource service 114 to the authentication service 115. The authentication service 115 can then authenticate a user of the secondary client device 109 before the user is allowed to access the enterprise resource 127. The authentication service 115 can prompt the user of the secondary client device 109 to provide authentication credentials. If the authentication service 115 is unable to verify that the provided authentication credentials are authentic, the authentication service 115 can provide an error message to the primary client device 106 or secondary client device 109.

If the authentication service 115 successfully verifies the provided authentication credentials, then the authentication service 115 can request content visibility metadata 130 for the enterprise resource 127 from the content visibility service 118. In return, the authentication service 115 can receive the requested content visibility metadata 130 from the content visibility service 118. In some implementations, the authentication service 115 can also receive a locator for the enterprise resource 127, such as a uniform resource locator (URL). The authentication service 115 can provide the locator for the enterprise resource 127 to the primary client device 106 or secondary client device 109, whichever requested access to the enterprise resource 127. In some implementations, the authentication service can also provide a locator for the management service 121, from which the primary client device 106 or secondary client device 109 may eventually receive the content visibility metadata 130. And in some implementations, the authentication service 115 can notify the enterprise resource service 114 that authentication was successful.

The content visibility service 118 can be executed to determine what content visibility metadata 130 apply to an enterprise resource 127. For example, the content visibility service can generate or access content visibility metadata 130 for the enterprise resource 127. The content visibility metadata 130 can indicate what, if any, portion of the enterprise resource 127 are sensitive. The content visibility service 118 can provide the content visibility metadata 130 to the authentication service 115 and the management service 121, along with a locator for the enterprise resource 127 In some implementations, the content visibility service 118 can also request that the management service 121 cause the primary client device 106 to enter P2P content visibility mode, assuming that the secondary client device 109 made the initial access request.

The management service 121 can be executed to administer the operation of primary client device 106 and secondary client device(s) 109 that are enrolled or otherwise registered with the management service 121. To this end, the management service 121 can also provide mechanisms for the primary client device 106 or a secondary client device 109 to enroll or otherwise register with the management service 121. The management can also install or cause to be installed various applications on the primary client device 106 or secondary client device 109 or for various configuration settings of the primary client device 106 or secondary client device 109 to be set to a specified value.

The management service 121 can generate a command to cause the primary client device 106 to enter a P2P content visibility mode. In P2P content visibility mode, the primary client device 106 can establish a P2P channel between the secondary client device 109. The primary client device 106 can then gather proximity data corresponding to the secondary client device 109, which the primary client device 106 can provide to the management service 121. In some implementations, the management service can provide this command to the primary client device 106 in response to receiving the content visibility metadata 130 from the content visibility service 118.

The management service 121 generate an access token 126 that the secondary client device 109 can use to access the content visibility metadata 130. The access token can include a character string, code, or other data. In some implementations, the management service 121 can encrypt the content visibility metadata 130 received from the content visibility service 118. The management service 121 can therefore generate the access token 126 as a cryptographic key capable of decrypting the content visibility metadata 130. The management service 121 can encrypt the content visibility metadata 130 and generate the access token 126 after receiving a request from the secondary client device 109. The management service 121 can then provide the encrypted content visibility metadata 130 to the secondary client device 109. Likewise, the management service 121 can provide the access token 126 to the primary client device 106.

The management service 121 can grant, deny, and revoke a secondary client device's 109 authorization to display sensitive portions of an enterprise resource 127. Before the secondary client device 109 is authorized to display sensitive portions of the enterprise resource 127, the management service 121 can determine whether the secondary client device 109 is compliant with the one or more compliance rules 131.

To illustrate, while the primary device 106 is in P2P content visibility mode or P2P secure viewing mode, the management service 121 can receive proximity data regarding the secondary client device 109 from the primary client device 106. This proximity data can indicate the secondary client device's 109 distance from the primary client device 106. Using this proximity data, the management service 121 can determine whether the secondary device 109 is within the predefined proximity threshold 132 of the primary device 106. This predefined proximity threshold 132 can define the distance within which the management service 121 can permit the secondary client device 109 to display sensitive portions of the enterprise resource 127. The management service 121 can receive proximity data continually while the primary client device 106 is in P2P content visibility mode or P2P secure viewing mode. Thus, the management service 121 can continually make determinations of whether the secondary client device 109 is within the proximity threshold 132 while the primary client device 106 is in P2P content visibility mode or P2P secure viewing mode.

If the secondary client device 109 is compliant with the one or more compliance rules 131, the management service 121 can cause the primary client device 106 to switch from P2P content visibility mode to P2P secure viewing mode. For example, during P2P content visibility mode, if the proximity data indicates that the secondary client device 109 is within the predefined proximity threshold 132, the management service 121 can generate a command to cause the primary client device 106 to enter P2P secure viewing mode. The management service 121 can then provide that command to the primary client device 106.

If the secondary client device 109 is not compliant with the one or more compliance rules 131, however, the primary client device 106 can remain in P2P content visibility mode. Thus, the secondary client device 109 may not be permitted to display those sensitive portions of the enterprise resource 127. For example, if the proximity data indicates that the secondary client device 109 meets or exceeds the predefined proximity threshold 132, the management service 121 may not permit the sensitive portions of the enterprise resource 127 to be displayed on the secondary client device 109. In that case, the management service 121 can provide an indication of this denial to the primary client device 106, as one example. As another example, the management service 121 can simply refrain from providing a command to enter P2P secure viewing mode to the primary client device 106.

While the primary client device 106 is in P2P secure viewing mode, the management service 121 can continue to monitor the secondary client device's 109 compliance with the one or more compliance rules 131. If the secondary client device 109 falls out of compliance during P2P secure viewing mode, the management service 121 can cause the primary client device 106 to switch back to P2P content visibility mode from P2P secure viewing mode. That way, the secondary client device 109 can no longer be authorized display sensitive portions of the enterprise resource 127 until the secondary client device 109 again becomes compliant with the one or more compliance rules 131.

For example, during P2P secure viewing mode, if the management service 121 determines that a proximity of the secondary client device 109 meets or exceeds the predefined proximity threshold 132, the secondary client device 109 may no longer be permitted to display sensitive portions of the enterprise resource 127. To that end, the management service 121 can command the primary client device 106 to end P2P secure viewing mode and re-enter P2P content visibility mode. That way, the secondary client device 109 can no longer display sensitive portions of the enterprise resource 127 unless and until the management service 121 determines that the secondary client device 109 is again within the predefined proximity threshold 132.

The enterprise resource(s) 127 can represent content associated with an enterprise that may include one or more portions deemed sensitive. Enterprise resources 127 can include any electronic data associated with an enterprise, such as databases, applications, text files, word processor files, spreadsheet files, presentation files, graphic files, audio files, photographic files, video files, applications and application files, and/or the like. Sensitive portions of an enterprise resource 127 can include any portion that an administrator or other user associated with an enterprise deems confidential and not to be viewed with parties not associated with the enterprise (or any other specified party).

The content visibility metadata 130 can represent metadata associated with various enterprise resources 127. The content visibility metadata 130 can indicate which portions of a particular enterprise resource 127 are sensitive. In some implementations, the content visibility metadata 130 can be generated by the content visibility service 118. For example, an administrator can use a management console or other utility to specify to the content visibility service 118 what portions of an enterprise resource 127 are sensitive. As another example, a user can specify what portions of an enterprise resource 127 are sensitive when creating the enterprise resource 127, based on which the content visibility service 118 can generate the content visibility metadata 130.

The one or more compliance rules 131 can represent, for example, configurable criteria that must be satisfied for the secondary client device 109 be in compliance with the management service 121. The compliance rules 131 can be based on a number of factors, including geographical location, activation status, enrollment status, and authentication data including authentication data obtained by a device registration system, time, and date, and network properties, among other factors associated with each device. The compliance rules 131 can also be determined based on a user account associated with a user of the secondary client device 109. Compliance rules 131 can include predefined constraints that must be met for the management service 121, or other applications, to permit access to the enterprise resources 127, including permission to display any sensitive portions of those the enterprise resources 127. The management service 121 can communicate with a management agent 136 executing on the primary client device 106 to determine whether states exist on secondary client device 109 that do or do not satisfy one or more compliance rules 131. States can include, for example, a virus or malware being detected on the device, violation of a baseline or verified behavior classification, installation or execution of a blacklisted application, and a device being "rooted" or "jailbroken," where root access is provided to a user of the device. Additional states can include the presence of particular files, questionable device configurations, vulnerable versions of applications, vulnerable states of the secondary client device 109, or other vulnerability, as can be appreciated.

One example of a compliance rule 131 can include a predefined proximity threshold 132. The predefined proximity threshold 132 can define the distance within which the management service 121 can permit the secondary client device 109 to display sensitive portions of the enterprise resource 127. The predefined proximity threshold 132 (and/or any other compliance rule 131) can be configured by an administrator using, for example, a management console provided by the management service 121.

The primary client device 106 can be representative of a client device that can be coupled to the network 112. The primary client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The primary client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the primary client device 106 or can be connected to the primary client device 106 through a wired or wireless connection. The primary client device 106 can be configured to execute various applications such as a management agent 136 and potentially other applications. The primary client device 106 can be selected as a primary device by a user of the primary client device 106 and secondary client device 109.

The management agent 136 can be installed on the primary client device 106 to facilitate management of the primary client device 106 by the management service 121. The management agent 136 can be installed with elevated privileges or be effectuated through operating system APIs to manage the primary client device 106 on behalf of the management service 121. The management agent 136 can have the authority to manage data on the primary client device 106; install, remove, or disable certain applications; or install configuration profiles, such as VPN certificates, Wi-Fi profiles, email profiles, or other profiles for configuring various functions or applications of the primary client device 106.

The management agent 136 can receive an access token 126 from the management service 121. The access token 126 can be used by the secondary client device 109 to decrypt encrypted content visibility metadata 130. The management agent 136 can provide the access token 126 to the secondary client device 109 when, for example, the management agent 136 receives a command to enter P2P secure viewing mode from the management service 121.

While in P2P content visibility mode or P2P secure viewing mode, the management agent 136 can gather proximity data regarding the secondary client device 109. The proximity data can allow the management agent 136 and/or the management service 121 to determine a distance between the primary client device 106 and the secondary client device 109. The management agent 136 can generate proximity data based on, for example, nearby Wi-Fi networks, Bluetooth, Bluetooth Low Energy, near-field communication, sound, or other suitable methods. The management agent 136 can continually provide this proximity data to the management service 121 while the primary client device 106 is in P2P content visibility mode or P2P secure viewing mode.

The primary client device 106 can communicate with the secondary client device(s) 109 via a P2P channel between the two. In some implementations, the management agent 136 can cause the primary client device 106 enter one or more different modes of communication with the secondary client device 109 over a P2P channel between the two devices. For example, the management agent 136 can cause the primary client device 106 to enter a P2P content visibility mode upon receiving a command from the management service 121. The management agent 136 can continually gather proximity data for the secondary client device 109 and transmit that proximity data to the management service 121. The primary client device 106 can remain in P2P content visibility mode until it receives a command from the management service 121 to enter P2P secure viewing mode, for example. As another example, the primary client device 106 can remain in P2P content visibility mode until the secondary client device 109 indicates that the enterprise resource 127 is no longer being accessed. In that case, the management agent 136 can cause the primary client device 106 to exit P2P secure viewing mode and end the P2P communication session with the secondary client device 109.

The management agent 136 can cause the primary client device 106 to enter the P2P secure viewing mode upon receiving a command from the management service 121. When the primary client device 106 enters P2P secure viewing mode, the management agent 136 can provide the access token 126 to the secondary client device 109 (unless the primary client device 106 has previously done so). The management agent 136 can continue to gather proximity data for the secondary client device 109 and transmit the proximity data to the management service 121.

The primary client device 106 can remain in P2P secure viewing mode until it receives a command from the management service 121 to re-enter P2P content visibility mode, for example. In that case, the management agent 136 can notify the secondary client device 109 that the primary client device 106 is re-entering P2P content visibility mode. As another example, the primary client device 106 can remain in P2P secure viewing mode until the secondary client device 109 indicates that the enterprise resource 127 is no longer being accessed. In that case, the management agent 136 can cause the primary client device 106 to exit P2P secure viewing mode and end the P2P communication session with the secondary client device 109.

The secondary client device(s) 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The secondary client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the secondary client device 109 or can be connected to the secondary client device 109 through a wired or wireless connection.

The secondary client device 109 can be configured to execute various applications such as a content viewing application 133 and potentially other applications. The content viewing application 133 can be executed to access network content served up by the computing environment 103 or other servers or computing devices, thereby rendering a user interface on a display. To this end, the content viewing application 133 can include a browser, a dedicated application, or other executable, and the user interface can include a network page, an application screen, or other user mechanism for obtaining user input. The secondary client device 109 can be configured to execute applications beyond the content viewing application 133 such as email applications, social networking applications, word processors, spreadsheets, or other applications.

The content viewing application 133 can request access to an enterprise resource 127. For instance, the content viewing application 133 can provide an access request for the enterprise resource 127 to the enterprise resource service 114. That access request can include, as an example, an identifier, a locator, or other identifying information regarding the enterprise resource 127. The access request can be redirected to the authentication service 115, which can begin an authentication process with the secondary client device 109.

The content viewing application 133 can authenticate with the authentication. service 118 to verify an identify of a user of the secondary client device 109. After an access request for the enterprise resource 127 is redirected from the enterprise resource service 114, the content viewing application 133 can receive an authentication prompt from the authentication service 115. The content viewing application 133 can then prompt a user of the secondary client device 109 to provide the authentication credentials using, for example, a user interface rendered in a display of the secondary client device 109. The authentication credentials can include password, passphrase, authentication code or token, encryption key, or similar data used to verify an identity of the user. The content viewing application 133 can provide the authentication credentials to the authentication service 115.

The content viewing application 133 can access the enterprise resource 127. In some implementations, the content viewing application 113 can receive a resource locator for the enterprise resource 127 from the authentication service 115. The content viewing application 133 can then use the resource locator to obtain the enterprise resource 127 from the enterprise resource service 114.

The content viewing application 133 can request content visibility metadata 130 associated with the enterprise resource 127 from the management service 121. This request can include, for example, the resource locator for the enterprise resource 127, an identifier for the enterprise resource 127, or other information regarding the enterprise resource 127. In return, the content viewing application 133 can receive the content visibility metadata 130 from the management service 121. The content visibility metadata 130, however, may be in an encrypted form when received from the management service 121. The content viewing application 133 may therefore be unable to access the content visibility metadata 130 without an access token 126 to decrypt the content visibility metadata 130.

The content viewing application 133 can receive an access token 126 from the primary client device 106 via a P2P communication channel. The content viewing application 133 can receive the access token 126 from the primary client device 106 when, for example, the primary client device 106 enters P2P content visibility mode. The access token 126 can represent the secondary client device's 109 authorization to display sensitive portions of the enterprise resource 127. To that end, the content viewing application 133 can decrypt the encrypted content visibility metadata 130 using the access token 126.

The content viewing application 133 can enable a user to view or otherwise access the enterprise resource 127, including any sensitive portions, in a display accessible to the secondary client device 109. The content viewing application 133 can do so by rendering a visual representation of the enterprise resource 127 in a display of the secondary client device 109, or by using another appropriate output device of the secondary client device 109 such as an audio output device. While in P2P secure viewing mode, the content viewing application 133 can display an entirety of the enterprise resource 127, without obscuring any sensitive portions of the enterprise resource 127.

While in P2P content visibility mode, however, the content viewing application 133 can obscure the sensitive portions of the enterprise resource 127. Which portions of the enterprise resource 127 are obscured can be based on the content visibility metadata 130. For example, the content visibility metadata 130 can specify that the content viewing application 133 should obscure specified text content, audio content, video content, or other portions of the enterprise resource 127. The content viewing application 133 can, for example, blur, render opaque, or otherwise obscure a view of the sensitive portions of the enterprise resource 127. If, however, the enterprise resource 127 include audio content, the content viewing application 133 can mute or otherwise obscure any sensitive audio output from the enterprise resource 127. In some implementations, the content viewing application 133 can notify the primary client device 106 when the enterprise resource 127 is no longer being accessed.

Figure 2A:
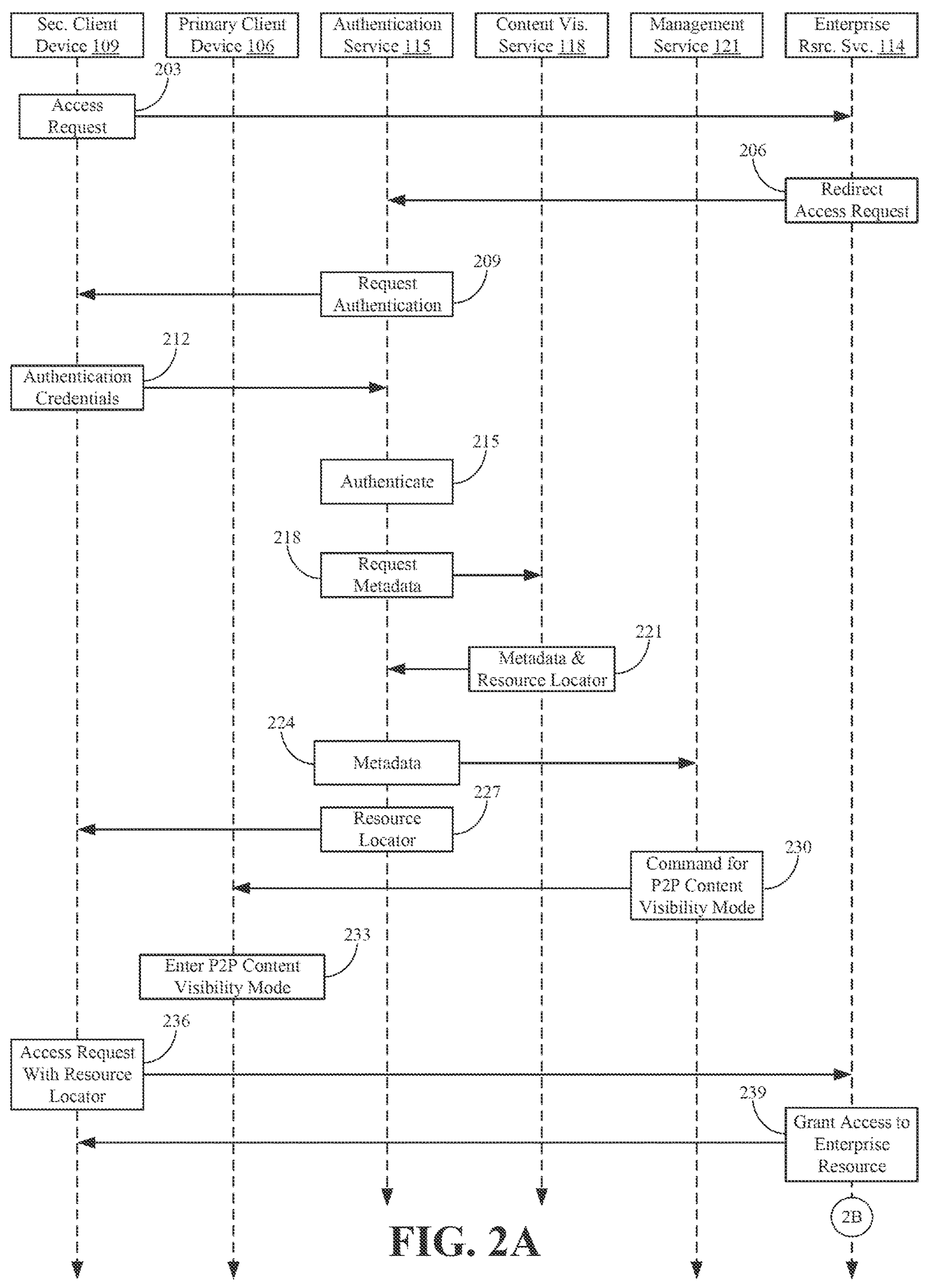
FIGS. 2A-C show sequence diagrams that provide examples of functionality implemented by components of the networked environment, according to various embodiments of the present disclosure.
Figure 2B:
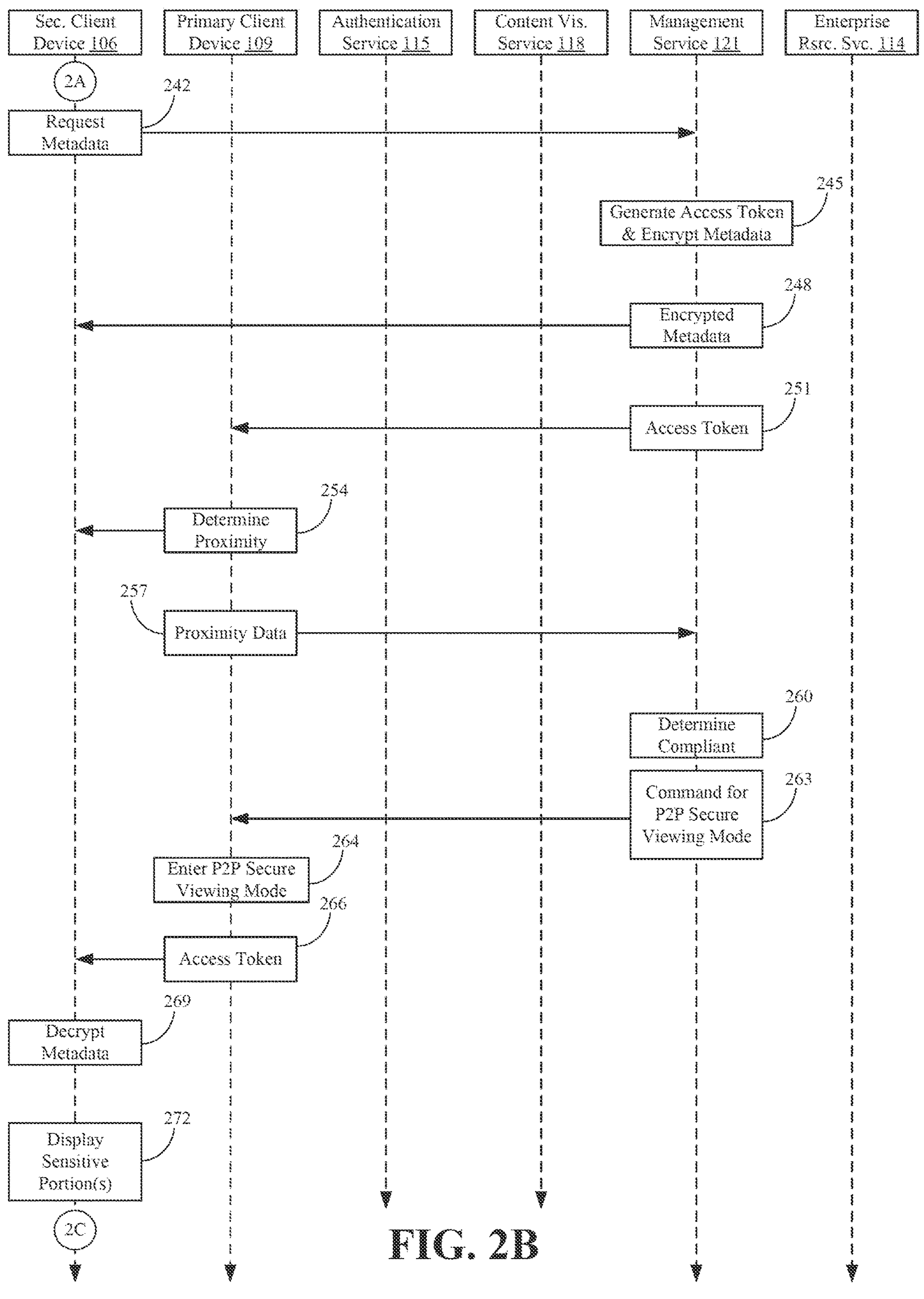
Figure 2C:
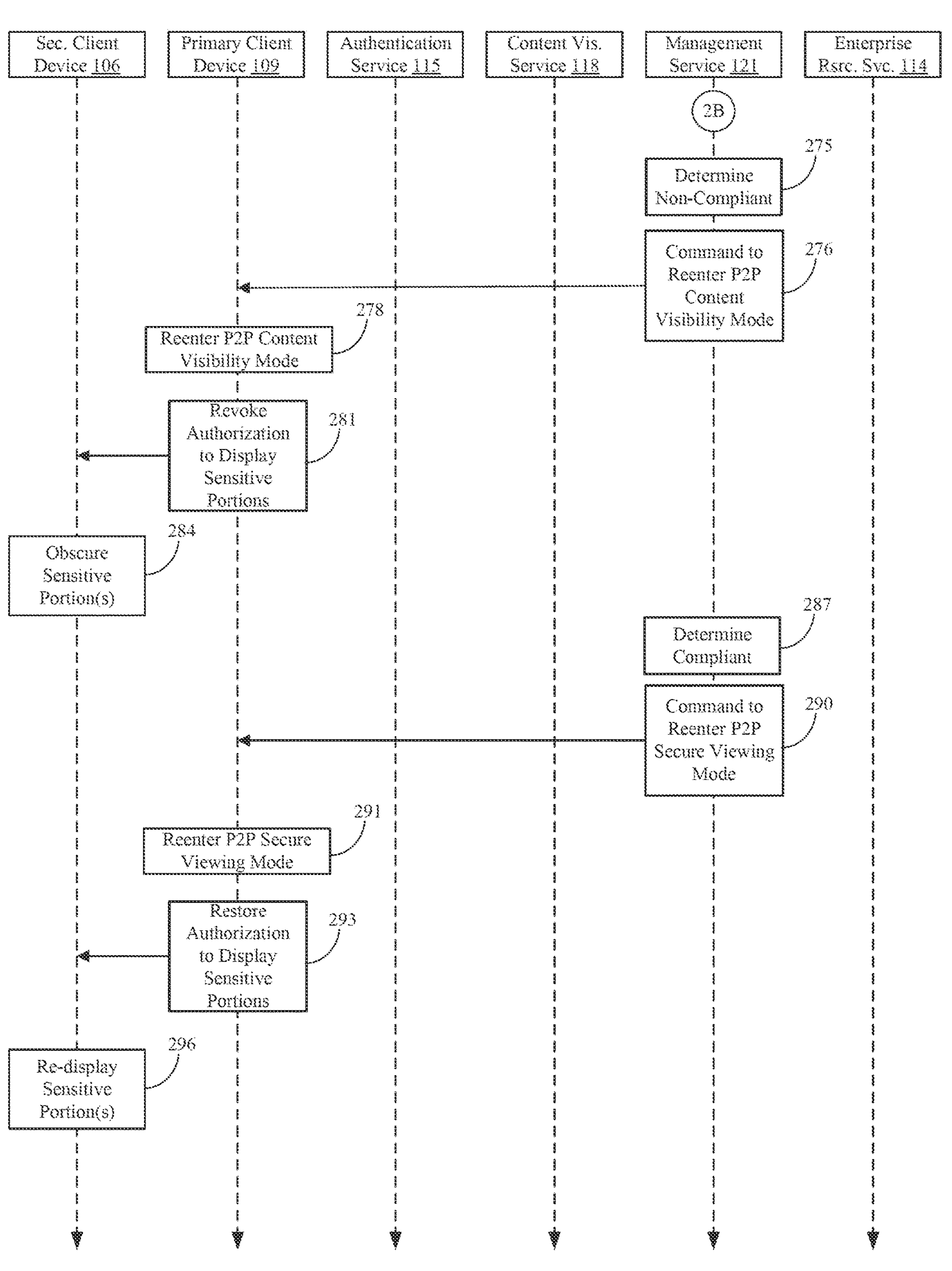

FIGS. 2A-C show sequence diagrams that provide examples of functionality implemented by components of the networked environment 100. It is understood that the sequence diagrams of FIGS. 2A-C provide merely an example of the many different types of functional arrangements that can be employed to implement the portions of the networked environment 100 as described herein. As an alternative, the sequence diagrams of FIGS. 2A-C can be viewed as depicting an example of elements of a method implemented within the networked environment 100.

Turning to FIG. 2A and step 203, the secondary client device 109 can provide an access request to the enterprise resource service 114. The secondary client device 109 can request access to a particular the enterprise resource 127. For instance, the secondary client device 109 can provide an access request for the enterprise resource 127 to the enterprise resource service 114. That access request can include, as an example, an identifier, a locator, or other identifying information regarding the enterprise resource 127.

At step 206, the enterprise resource service 114 can redirect the access request to the authentication service 115. The enterprise resource service 114 can redirect the access request because authentication is required to authenticate before accessing the enterprise resource 127.

At step 209, the authentication service 115 can request that a user of the secondary client device 109 authenticate with the authentication service 115. The authentication service 115 can authenticate the user of the secondary client device 109 before the user is allowed to access the enterprise resource 127. The authentication service 115 can therefore prompt the user of the secondary client device 109 to provide authentication credentials.

At step 212, the secondary client device 109 can provide authentication credentials to the authentication service 115. The secondary client device 109 can prompt a user of the secondary client device 109 to provide the authentication credentials using, for example, a user interface rendered in a display of the secondary client device 109. The authentication credentials can include password, passphrase, authentication code or token, encryption key, or similar data used to verify an identity of the user.

At step 215, the authentication service 115 can authenticate the user of the secondary client device 109. To authenticate the user, the authentication service 115 can verify that the authentication credentials received at step 212 are authentic.

At step 218, the authentication service 115 can request content visibility metadata 130 associated with the enterprise resource 127. If the authentication service 115 successfully verifies the provided authentication credentials, then the authentication service 115 can provide the request for the content visibility metadata 130 to the content visibility service 118.

At step 221, the content visibility service 118 can provide the content visibility metadata 130 and a resource locator for the enterprise resource 127 to the authentication service 115. The content visibility metadata 130 can represent metadata associated with various enterprise resources 127. The content visibility metadata 130 can indicate which portions of a particular enterprise resource 127 are sensitive. In some implementations, the content visibility metadata 130 can be generated by the content visibility service 118. For example, an administrator can use a management console or other utility to specify to the content visibility service 118 what portions of an enterprise resource 127 are sensitive. As another example, a user can specify what portions of an enterprise resource 127 are sensitive when creating the enterprise resource 127, based on which the content visibility service 118 can generate the content visibility metadata 130. The resource locator can include a URL or other locator that can be used to access the enterprise resource 127.

At step 224, the authentication service 115 can provide the content visibility metadata 130 to the management service 121.

At step 227, the authentication service 115 can provide the resource locator for the enterprise resource 127 to the secondary client device 109.

At step 230, the management service 121 can generate a command to cause the primary client device 106 to enter P2P content visibility mode. In P2P content visibility mode, the primary client device 106 can establish a P2P communication channel with the secondary client device 109. While the primary client device 106 is in P2P content visibility mode, the management service 121 can receive proximity data for the secondary client device 109 from the primary client device 106.

At step 233, the primary client device 106 can enter P2P content visibility mode. During P2P content visibility mode, the primary client device 106 can continually gather proximity data for the secondary client device 109 and transmit that proximity data to the management service 121. The primary client device 106 can remain in P2P content visibility mode until it receives a command from the management service 121 to enter P2P secure viewing mode, for example. The primary client device 106 can generate proximity data based on, for example, nearby Wi-Fi networks, Bluetooth, Bluetooth Low Energy, near-field communication, sound, or other suitable methods.

At step 236, the secondary client device 109 can provide another access request for the enterprise resource 127 to the enterprise resource service 114. This access request can comprise the resource locator that the secondary client device 109 received at step 227.

At step 239, the enterprise resource service 114 can provide the secondary client device 109 with access to the enterprise resource 127. The process shown in FIG. 2A can then proceed into FIG. 2B.

Turning to FIG. 2B and step 242, the secondary client device 109 can request the content visibility metadata 130 associated with the enterprise resource 127 from the management service 121. This request can include, for example, the resource locator for the enterprise resource 127, an identifier for the enterprise resource 127, or other information regarding the enterprise resource 127.

At step 245, the management service 121 can generate an access token 126 for accessing the content visibility metadata 130 and encrypt the content visibility metadata 130. The management service 121 can encrypt the content visibility metadata 130 and generate the access token 126 in response to receiving the request from the secondary client device 109 at step 242. The management service 121 can generate the access token 126 as a cryptographic key capable of decrypting the content visibility metadata 130. Likewise, the management service 121 can encrypt the content visibility metadata 130 so that it may be decrypted using the access token 126.

At step 248, the management service 121 can provide the content visibility metadata 130 to the secondary client device 109. But, as discussed in step 245, the content visibility metadata 130 can be in an encrypted form when received by the secondary client device 109. The secondary client device 109 may therefore be unable to access the content visibility metadata 130 without the access token 126 to decrypt the content visibility metadata 130

At step 251, the management service 121 can provide the access token 126 to the primary client device 106. The access token 126 can be used by the secondary client device 109 to decrypt encrypted content visibility metadata 130. The primary client device 106, however, can refrain from providing the access token 126 to the secondary client device 109 until the primary client device 106 enters P2P secure viewing mode.

At step 254, the primary client device 106 can determine a proximity of the secondary client device 109 to the primary client device 106. While in P2P content visibility mode or P2P secure viewing mode, the management agent 136 can continually gather proximity data regarding the secondary client device 109. The proximity data can allow the primary client device 106 to determine a distance between the primary client device 106 and the secondary client device 109. The primary client device 106 can generate proximity data based on, for example, nearby Wi-Fi networks, Bluetooth, Bluetooth Low Energy, near-field communication, sound, or other suitable methods.

At step 257, the primary client device 106 can provide the proximity data to the management service 121. The primary client device 106 can continually provide this proximity data to the management service 121 while the primary client device 106 is in P2P content visibility mode.

At step 260, the primary client device 106 can determine that the secondary client device 109 is in compliance with the one or more compliance rules 131. For example, the management service 121 can determine that the secondary client device 109 is within a predefined proximity threshold 132 of the primary client device 106 based on the proximity data received step 257. This predefined proximity threshold 132 can define the distance within which the management service 121 can permit the secondary client device 109 to display sensitive portions of the enterprise resource 127.

At step 263, the management service 121 can generate a command to cause the primary client device 106 to enter P2P secure viewing mode and provide the command to the primary client device 106. The management service 121 can generate this command in response to determining that the secondary client device 109 is compliant with the one or more compliance rules 131 at step 260. That way, the secondary client device 109 can be permitted to display sensitive portions of the enterprise resource 127.

At step 264, the primary client device 106 can enter P2P secure viewing mode in response to the command received at step 263. While the primary client device 106 is in P2P secure viewing mode, the secondary client device 109 can be permitted to display sensitive portions of the enterprise resource 127. In addition, while the primary client device 106 is in P2P secure viewing mode, the primary client device 106 can continue to gather proximity data for the secondary client device 109 and providing the proximity data to the management service 121.

At step 266, the primary client device 106 can provide the access token 126 to the secondary client device 109. The primary client device 106 can provide the access token 126 to the secondary client device 109 in response to entering P2P secure viewing mode. Providing the access token 126 to the secondary client device 109 can permit the secondary client device 109 to display the sensitive portions of the enterprise resource 127.

At step 269, the secondary client device 109 can decrypt the content visibility metadata 130 using the access token 126. The secondary client device 109 can have received the content visibility metadata 130 in an encrypted form at step 248. The secondary client device 109 can decrypt the content visibility metadata 130 using the access token 126 received at step 266.

At step 272, the secondary client device 109 can display the one or more sensitive portions of the enterprise resource 127. The secondary client device 109 can enable a user to view or otherwise access the enterprise resource 127, including any sensitive portions, in a display accessible to the secondary client device 109. The secondary client device 109 can do so by rendering a visual representation of the enterprise resource 127 in a display of the secondary client device 109, or by using another appropriate output device of the secondary client device 109 such as an audio output device. While in P2P secure viewing mode, the secondary client device 109 can display an entirety of the enterprise resource 127, without obscuring any sensitive portions of the enterprise resource 127. The secondary client device 109 can continue to display the sensitive portions of the enterprise resource 127 while the primary client device 106 remains in P2P secure viewing mode (or a user of the secondary client device 109 ceases accessing the enterprise resource 127). The process shown in FIG. 2B can then proceed into FIG. 2C.

Turning to FIG. 2C and step 275, the management service 121 can determine that the secondary client device 109 has become non-compliant with the one or more compliance rules 131. The management service 121 can continue to evaluate whether the secondary client device 109 is compliant with the one or more compliance rules 131 while the primary client device 106 remains in P2P secure viewing mode. For example, the management service 121 can continue to evaluate whether the secondary client device 109 is within the predefined proximity threshold 132 based on the proximity data continually received from the primary client device 106. The management service 121 can therefore detect that the secondary client device 109 meets or exceeds the predefined proximity threshold 132 (or otherwise falls out of compliance with the one or more compliance rules 131) virtually in real time.

At step 276, the management service 121 can generate a command to cause the primary client device 106 to switch from P2P secure viewing mode back to P2P content visibility mode. The management service 121 can generate this command in response to determining that the secondary client device 109 is no longer compliant with the one or more compliance rules 131 at step 275. That way, the secondary client device 109 will no longer be authorized to display the sensitive portions of the enterprise resource 127 unless and until the management service 121 determines that the secondary client device 109 is again compliant with the one or more compliance rules 131.

At step 278, the primary client device 106 can reenter P2P content visibility mode. The primary client device 106 can continually gather proximity data for the secondary client device 109 and transmit that proximity data to the management service 121. The primary client device 106 can remain in P2P content visibility mode until it receives a command from the management service 121 to again enter P2P secure viewing mode, for example.

At step 281, the management service 121 can notify the secondary client device 109 that it is no longer authorized to display the sensitive portions of the enterprise resource 127. Doing so can ensure that the secondary client device 109 does not display the sensitive portions of the enterprise resource 127 until the secondary client device 109 is once again compliant with the one or more compliance rules 131.

At step 284, the secondary client device 109 can obscure the sensitive portions of the enterprise resource 127. Which portions of the enterprise resource 127 are obscured can be based on the content visibility metadata 130. For example, the content visibility metadata 130 can specify that the content viewing application 133 should obscure specified text content, audio content, video content, or other portions of the enterprise resource 127. The content viewing application 133 can, for example, blur, render opaque, or otherwise obscure a view of the sensitive portions of the enterprise resource 127. If, however, the enterprise resource 127 include audio content, the content viewing application 133 can mute or otherwise obscure any sensitive audio output from the enterprise resource 127.

At step 287, the management service 121 can determine that the secondary client device 109 has once again become compliant with the one or more compliance rules 131. For example, the management service 121 can determine that the secondary client device 109 is once again within the predefined proximity threshold 132 of the primary client device 106. The management service 121 can make this determination based on the proximity data continually being received from the primary client device 106. For example, the management service 121 can determine that the secondary client device 109 is again within a predefined proximity threshold 132 of the primary client device 106 based on the proximity data continually being received from the primary client device 106.

At step 290, the management service 121 can generate a command to cause the primary client device 106 to reenter P2P secure viewing mode and provide the command to the primary client device 106. The management service 121 can generate this command in response to determining that the secondary client device 109 is again compliant with the one or more compliance rules 131 at step 287.

At step 291, the primary client device 106 can reenter P2P secure viewing mode. While the primary client device 106 is in P2P secure viewing mode, the primary client device 106 can continue to gather proximity data for the secondary client device 109 and providing the proximity data to the management service 121.

At step 293, the primary client device 106 can notify the secondary client device 109 that it is once again authorized to display the sensitive portions of the enterprise resource 127. The primary client device 106 can provide this notification in response to reentering P2P secure viewing mode at step 291. That way, the secondary client device 109 may once again be permitted to display the sensitive portions of the enterprise resource 127.

At step 296, the secondary client device 109 can redisplay the sensitive portions of the enterprise resource 127. The secondary client device 109 can enable a user to again view or otherwise access the sensitive portions of the enterprise resource 127. Indeed, the secondary client device 109 can again display an entirety of the enterprise resource 127, without obscuring the sensitive portions of the enterprise resource 127.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A system comprising:

a primary computing device;

machine-readable instructions that, when executed, cause the primary computing device to at least:

establish a peer-to-peer (P2P) communication session between the primary computing device and a secondary computing device;

determine proximity data associated with a proximity of the primary computing device to the secondary computing device;

transmit the proximity data to a management service remotely located with respect to the primary computing device and the secondary computing device;

receive, at the primary computing device from the management service, an indication that the primary computing device is within a predefined proximity threshold of the secondary computing device and an access token used to decrypt metadata associated with an enterprise resource received by the secondary computing device from the management service;

in response to the indication, enter the primary computing device into a secure viewing mode of the P2P communication session and transmit the access token to the secondary computing device via the P2P communication session while in the secure viewing mode, wherein the primary computing device transmits the access token to the secondary computing device only in response to receiving the indication from the management service that the predefined proximity threshold is satisfied, and withholds transmission of the access token in the absence of the indication, and wherein the access token is used by the secondary computing device to decrypt the metadata and to render the enterprise resource in a display accessible to the secondary computing device in response to receiving the access token;

continually re-transmit to the management service, updated proximity data associated with the proximity of the primary computing device to the secondary computing device while the primary computing device remains in the secure viewing mode of the P2P communication session;

receive a notification from the management service indicating that the primary computing device is not within the predefined proximity threshold of the secondary computing device; and in response to the notification, terminate the secure viewing mode of the P2P communication session, wherein the secondary computing device obscures at least one sensitive portion of the enterprise resource in the display based at least in part on the metadata in response to termination of the secure viewing mode of the P2P communication session, wherein rendering of the enterprise resource by the secondary computing device is permitted only while the primary computing device remains within the predefined proximity threshold as determined by the management service, wherein the indication that the primary computing device is within the predefined proximity threshold of the secondary computing device is generated by the management service based on the proximity data transmitted by the primary computing device, and the notification that the primary computing device is not within the predefined proximity threshold of the secondary computing device is generated by the management service based on the updated proximity data.

2. The system of claim 1, wherein the machine-readable instructions further cause the primary computing device to at least cause the at least one sensitive portion of the enterprise resource to be rendered visible in the display by transmitting a notification to the secondary computing device that the primary computing device is within the predefined proximity threshold of the secondary computing device.

3. The system of claim 2, wherein the proximity of the primary computing device to the secondary computing device is determined based at least in part on at least one of: at least one nearby Wi-Fi network, Bluetooth, Bluetooth Low Energy, near-field communication, or sound detection.

4. The system of claim 1, wherein the metadata specifies the at least one sensitive portion of the enterprise resource to be obscured.

5. A method, comprising:

establishing a peer-to-peer (P2P) communication session between a primary computing device and a secondary computing device;

determining proximity data associated with a proximity of the primary computing device to the secondary computing device;

transmitting the proximity data by the primary computing device to a management service remotely located with respect to the primary computing device and the secondary computing device;

receiving, at the primary computing device from the management service, an indication that the primary computing device is within a predefined proximity threshold of the secondary computing device and an access token used to decrypt metadata associated with an enterprise resource received by the secondary computing device from the management service;

in response to the indication, entering the primary computing device into a secure viewing mode of the P2P communication session and transmitting the access token from the primary computing device to the secondary computing device via the P2P communication session while the primary computing device is in the secure viewing mode, wherein the primary computing device transmits the access token to the secondary computing device only in response to receiving the indication from the management service that the predefined proximity threshold is satisfied, and withholds transmission of the access token in the absence of the indication, and wherein the access token is used by the secondary computing device to decrypt the metadata and to render the enterprise resource in a display accessible to the secondary computing device in response to receiving the access token;

continually re-transmitting, by the primary computing device to the management service, updated proximity data associated with the proximity of the primary computing device to the secondary computing device while the primary computing device remains in the secure viewing mode of the P2P communication session;

receiving, by the primary computing device from the management service, a notification that the primary computing device is not within the predefined proximity threshold of the secondary computing device; and in response to the notification, terminating, by the primary computing device, the secure viewing mode of the P2P communication session, wherein the secondary computing device obscures at least one sensitive portion of the enterprise resource in the display based at least in part on the metadata and in response to termination of the secure viewing mode, wherein rendering of the enterprise resource by the secondary computing device is permitted only while the primary computing device remains within the predefined proximity threshold as determined by the management service, wherein the indication that the primary computing device is within the predefined proximity threshold of the secondary computing device is generated by the management service based on the proximity data transmitted by the primary computing device, and the notification that the primary computing device is not within the predefined proximity threshold of the secondary computing device is generated by the management service based on the updated proximity data.

6. The method of claim 5, wherein the secondary computing device causes the at least one sensitive portion of the enterprise resource to be rendered visible in the display in response to receiving a notification that the primary computing device is within the predefined proximity threshold of the secondary computing device.

7. The method of claim 5, wherein the proximity of the primary computing device to the secondary computing device is determined based at least in part on at least one of: at least one nearby Wi-Fi network, Bluetooth, Bluetooth Low Energy, near-field communication, or sound detection.

8. The method of claim 5, wherein the metadata specifies the at least one sensitive portion of the enterprise resource to be obscured.

9. A non-transitory computer-readable medium embodying program instructions that, when executed, cause a primary computing device to at least:

establish a peer-to-peer (P2P) communication session between the primary computing device and a secondary computing device;

determine proximity data associated with a proximity of the primary computing device to the secondary computing device;

transmit the proximity data to a management service remotely located with respect to the primary computing device and the secondary computing device;

receive, at the primary computing device from the management service, an indication that the primary computing device is within a predefined proximity threshold of the secondary computing device and an access token used to decrypt metadata associated with an enterprise resource received by the secondary computing device from the management service;

in response to the indication, enter the primary computing device into a secure viewing mode of the P2P communication session and transmit the access token to the secondary computing device via the P2P communication session while in the secure viewing mode, wherein the primary computing device transmits the access token to the secondary computing device only in response to receiving the indication from the management service that the predefined proximity threshold is satisfied, and withholds transmission of the access token in the absence of the indication, and wherein the access token is used by the secondary computing device to decrypt the metadata and to render the enterprise resource in a display accessible to the secondary computing device in response to receiving the access token;

continually re-transmit to the management service, updated proximity data associated with the proximity of the primary computing device to the secondary computing device while the primary computing device remains in the secure viewing mode of the P2P communication session;

receive a notification from the management service indicating that the primary computing device is not within the predefined proximity threshold of the secondary computing device; and in response to the notification, terminate the secure viewing mode of the P2P communication session, wherein the secondary computing device obscures at least one sensitive portion of the enterprise resource in the display based at least in part on the metadata in response to termination of the secure viewing mode of the P2P communication session, wherein rendering of the enterprise resource by the secondary computing device is permitted only while the primary computing device remains within the predefined proximity threshold as determined by the management service, wherein the indication that the primary computing device is within the predefined proximity threshold of the secondary computing device is generated by the management service based on the proximity data transmitted by the primary computing device, and the notification that the primary computing device is not within the predefined proximity threshold of the secondary computing device is generated by the management service based on the updated proximity data.

10. The non-transitory computer-readable medium of claim 3, wherein the program instructions further cause the primary computing device to at least cause the at least one sensitive portion of the enterprise resource to be rendered visible in the display by sending a notification to the secondary computing device that the proximity of the primary computing device to the secondary computing device is within the predefined proximity threshold.

11. The non-transitory computer-readable medium of claim 9, wherein the proximity of the primary computing device to the secondary computing device is determined based at least in part on at least one of: at least one nearby Wi-Fi network, Bluetooth, Bluetooth Low Energy, near-field communication, or sound detection.

12. The non-transitory computer-readable medium of claim 9, wherein the metadata specifies the at least one sensitive portion of the enterprise resource to be obscured.

* * * * *